Aug. 29, 1944.  H. A. CHUBBUCK  2,356,972
ELECTRICAL APPARATUS
Filed March 14, 1941   2 Sheets-Sheet 1
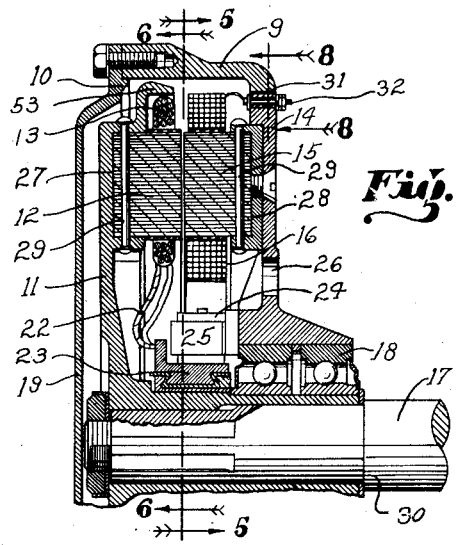

Aug. 29, 1944.　　　H. A. CHUBBUCK　　　2,356,972
ELECTRICAL APPARATUS
Filed March 14, 1941　　2 Sheets-Sheet 2
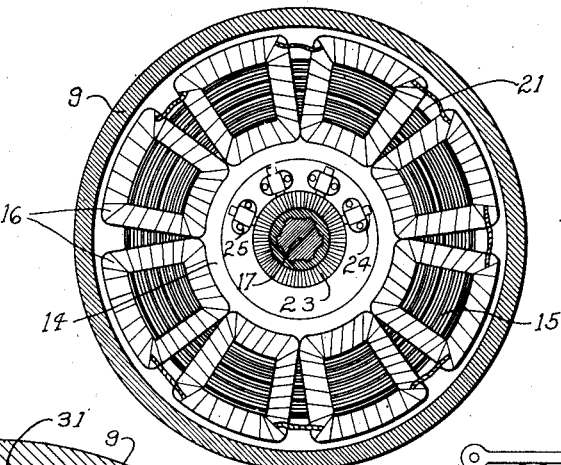
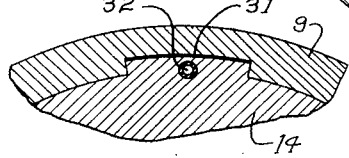
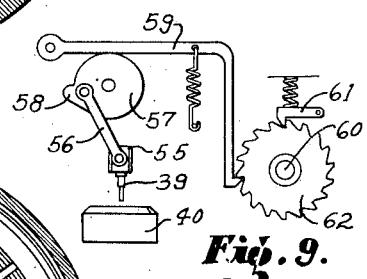
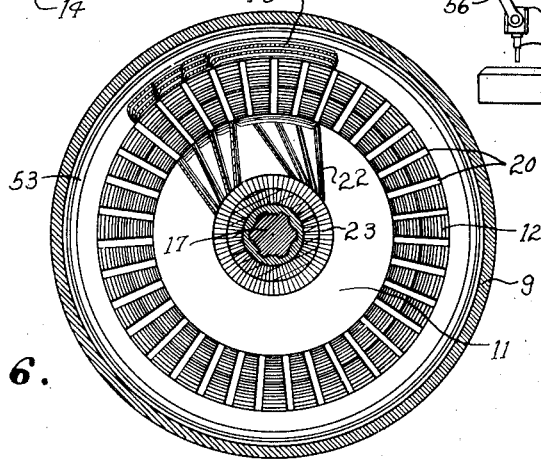
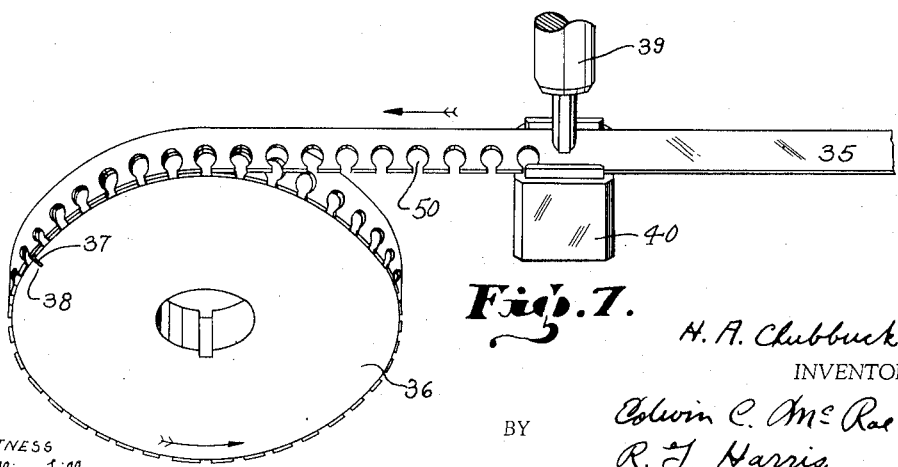
H. A. Chubbuck
INVENTOR.
BY Colvin C. McRae
R. J. Harris.
ATTORNEYS.
WITNESS
William Jilly Patented Aug. 29, 1944

2,356,972

UNITED STATES PATENT OFFICE 2,356,972

ELECTRICAL APPARATUS

Horace A. Chubbuck, Dearborn, Mich., assignor to Ford Motor Company, Dearborn, Mich., a corporation of Delaware Application March 14, 1941, Serial No. 383,361

6 Claims. (Cl. 171—252)

This invention relates to electrical machinery, more particularly to a method of constructing laminated cores for armature and field pieces, etc.; and to an improved construction made possible by the use of my method.

Electrical machines such as motors, generators, alternators, etc., customarily include field and armature windings mounted on metallic cores. To prevent excessive losses through eddy currents and to increase the electrical efficiency, these cores are formed of a number of laminated plates. In the ordinary process of manufacture of such cores, a number of individual core laminae or plates having suitable circumferential winding slots are stamped out of sheet stock. The individual stampings are then stacked with the slot holes aligned to form the core. Suitable windings are then applied to the slots in these cores as required to obtain the desired electrical circuit.

An undesirable feature of this method is the large amount of metal which must be scrapped in the process of making the stampings. The metal used in these cores, which is known as electrical steel, is in reality a relatively pure iron with a very low carbon content. In addition, the surface is specially treated to obtain certain desired characteristics. Consequently, the stock is expensive. The scrap remaining after the stampings are made from the stock, however, is worth no more as such than is ordinary scrap from other sources. Taking as an example a generator such as is illustrated in the accompanying drawings, in which the armature and field cores are made in the form of a ring, it will be seen that all the stock stamped from the center of such a ring is scrap as well as a considerable portion of metal struck out around the circumference. In addition to this metal, the stampings from the sheet which forms the slot openings are also scrap.

It is a purpose of this invention to devise a method of making such cores in which by far the greatest part of the waste is avoided. In fact, the only metal which need be scrapped when cores are made according to this invention is that which is stamped out to form the slots. It is a further advantage of this invention, that by following it a core is formed in which the slots are automatically aligned and in which the stamping of the required slots and the fabrication of the completed core are carried out simultaneously.

This novel method of core formation, while of general utility, is particularly valuable when applied to an electrical machine of the form illustrated. As an example, a generator is shown in which armature and field cores are in the form of rings of substantially the same size placed side by side. With this arrangement, it is possible to obtain a very close initial adjustment of the air gap between cores and to correct or alter this gap thereafter.

The advantage of this is that by adjusting this gap, the voltage may be changed without altering the speed. This, in itself, is not novel, but when applied to the usual construction where the field encircles the armature, a considerable change in armature position is necessary to alter the voltage appreciably. In the present generator, a very slight additional separation of the cores results in a large voltage change.

It is a purpose of this invention, therefore, to devise a method by which cores for electrical machines may be formed with a minimum of material waste; and by which they may be stamped, the slots aligned, and the core assembled in a single operation.

It is an advantage of this method that one die will serve to punch an unlimited number of slot arrangements or sizes, while former methods require separate dies for each such arrangement or size. Furthermore, it is possible to arrange the slots in the completed core so they extend radially or with any desired obliquity therefrom; and this may be done automatically during the assembly process.

It is a further advantage that cores so constructed are, in a sense, self-locking in that they will not tend to loosen, nor do they need to be confined between rigid cover plates.

Other novel and advantageous features, which are applicable to electrical machines in general, will be pointed out more specifically in the description of the method and generator which follows.

With these and other objects in view, my invention consists in the arrangement, construction, and combination of the various parts of my improved device, and the steps of my methods, as described in this specification, claimed in my claims, and illustrated in the accompanying drawings, in which:

Figure 1 is a partial sectional elevation of a generator constructed according to this invention.

Figure 2 is a schematic showing of the method used to construct the core pieces of such a generator.

Figures 3 and 4, respectively, are plan views of portions of the stampings used to produce the armature and field core pieces.

Figure 5 is a cross section through the generator taken on a plane such as is partially indicated by the line 5—5 of Figure 1 and on a reduced scale therefrom.

Figure 6 is a cross section similar to Figure 5 but taken on the line 6—6 of Figure 1 and on a reduced scale therefrom.

Figure 7 is a schematic showing of a variation of the method which may be employed.

Figure 8 is a partial cross section taken on the line 8—8 of Figure 1.

Figure 9 is a schematic diagram showing a synchronized drive means.

It will be understood that Figure 1 shows only the upper portion of the generator of this invention; but as the construction is symmetrical, as shown in Figures 5 and 6, the showing of a complete elevation would be merely repetitive.

Referring now to Figure 1, reference figure 10 indicates generally a generator constructed according to this invention. This includes a rotor 11 to which is secured the armature core 12 and the armature winding 13; and a stator 14 to which is secured the field core 15 and the field winding 16. The rotor is splined to the drive shaft 17 which is rotatably mounted in the bearings 18 carried by the stator. The enclosure of the generator is completed by a housing which comprises the end plate 19 and a circumferential ring 9, the latter being adjustably connected to the stator 14 as described below. In automotive use, the ring 9 might be secured to or form a part of the engine block and the engine crankshaft extended could serve as shaft 17. In other use, a pedestal could be affixed to the ring 9 and the shaft 17 would be the connection to a suitable prime mover.

The armature and field cores 12 and 15 are constructed by a method which will be described more fully. For the present, it will suffice to note that the cores are in the form of a ring and are constructed by spirally winding a thin, narrow strip of electrical steel stock to build up a laminated ring of the desired dimensions.

Referring to Figure 6, it will be seen that the armature core is provided with a number of spaced, radially disposed slots 20 in which the armature windings 13 are placed, a portion of such windings being shown. Similarly, Figure 5 shows that the field core includes a number of slots 21 which hold the field winding 16 and form pole pieces. In the specific generator shown, there are thirty-five such slots in the armature and eight in the field, forming the eight poles required by the electrical design.

The leads 22 from the various armature windings, as shown in Figure 6, are connected with appropriate segments of a commutator 23 which is carried on the rotor. A plurality of brushes 24, carried in suitable brush holders 25 attached to the stator, make electrical contact with the commutator. Ports 26 are provided in the body of the housing to permit the ready inspection and adjustment of these brushes.

It will be noted from Figure 1 that an integral circular channel 27 is formed on the rotor; and that a removable circular channel 28 is secured to the stator. These channels receive the respective core pieces 12 and 15 which are held therein by rivets 29. The shaft 17 includes a shoulder 30 which is used to regulate the air gap between the respective core pieces. It will be noted that the rotor is secured to the shaft and, that by suitable shimming the relation of the stator to the shoulder, and hence to the rotor, may be carefully adjusted. As the generator is supported by the peripheral ring 9 of the housing and the stator is keyed therein as at 31 (see Figure 8), the stator has a limited axial motion with reference to the housing. Consequently, the air gap may be closely adjusted and maintained even though considerable inaccuracy may exist in the proportioning of the component parts. Binding posts such as 32 are supplied for electrical connections.

Attention is now directed to Figures 2, 3, 4, 7 and 9 which show the methods followed in fabricating these cores. Figure 7 shows one method which comprises punching spaced slot holes in electrical core stock and then winding the stock to form a completed core. The stock is indicated as 35 and the form upon which the core is to be wound as 36. The form is mounted on a suitable rotating mechanism, not shown thereon, which is designed, in the case of the 35-slot armature shown here, to rotate intermittently through $\frac{1}{35}$ of a turn during each of successive intervals. To start the operation, the end of the stock is bent at right angles to form an anchor 37 which is to fit in a slot 38 on the form 36, and about fifteen slot holes are punched in the stock, spaced at a distance equal to $\frac{1}{35}$ of the circumference of the form on centers. The stock is then secured to the form by the anchor referred to, and the last hole punched is arranged between the punch 39 and the anvil 40 and in register therewith.

Another method of starting is to make the radius of the form 36 less by the thickness of the stock than that of the required final internal radius of the core. The unpunched stock is then anchored to the form as above and about half a turn wound on before the punching is started. When the core is completely wound, the unpunched initial portion may be removed.

The intermittent rotation of the form 36 is then started and the punch 39 is operated after each $\frac{1}{35}$ turn of the form. It is apparent that as the number of turns of stock in the core is increased, the distance between the slot punchings must be increased if the successive holes are to line up with those previously punched. I find that by using the method illustrated, i. e., employing the winding form as an indexing means for the stamping of the slots, that I am able to form an armature having aligned slots in one continuous operation.

Figure 9 shows, schematically, one means by which the winding and punching may be synchronized. The punch 39 is shown carried in a cross head 55 driven through the connecting rod 56 by the crank 57 of the punch press. The crank has a cam surface 58 cooperating with a pivoted cam follower 59. The latter engages the ratchet wheel 62 secured on the shaft 60 which is designed to carry the form 36. The usual dog 61 is provided to prevent back motion.

Each operation of the punch 39 causes the ratchet wheel 62 to advance one tooth, with corresponding motion of shaft 60 and form 36. In the present case, a ratchet wheel having thirty-five teeth would be required.

However, it is apparent that when the method of Figure 7 is followed, the slots will not be radial due to the fact that in a continuous spiral such as is formed there must be a further variation in indexing as the winding progresses. While it is not absolutely essential that these slots be radial, and indeed in some designs they are given a slight lead to prevent hum, in the larger cores they may become too oblique unless some additional compensation is made. Accordingly, I have developed a second method shown in Figures 2, 3 and 4 in which the necessary compensation is made automatically and by the use of which radial slots or slots of any desired degree of obliquity may be obtained.

In this embodiment, the form 36 is slidably mounted on rods 41 by means of a crosshead 42. A heavy spring 43 normally urges the form into contact with a pilot wheel 44, the line of contact between the form and the pilot wheel being level with the stamping surface of the anvil 40. The anvil and punch, 39 and 40, are mounted to permit a limited horizontal motion. Secured to the anvil is a cam 45 which is in contact with the form 36, and is normally urged to maintain such contact by a spring 46. I also provide guide rollers 47 and a suitable tension brake 48 to maintain the stock under suitable tension during the operation.

The method of using this apparatus is somewhat similar to that described under Figure 7. After the stock is engaged on the form as described there, the intermittent rotation of the form is commenced, and the punch is operated between each such rotation of 1/35 turn. It is apparent that as additional layers build up on the form, the diameter thereof, insofar as pilot wheel 44 and cam 45 are concerned, is increased. As a result, the axis of the form is forced downwardly and the cam 41 is correspondingly forced away from the said axis. As a result, the punching mechanism, comprising punch 39 and anvil 40, is also forced to the left, thereby increasing the linear distance between successive punches. This compensation is entirely automatic and is effective during the entire winding operation. The dashed lines 49 on form 36 in Figure 2 indicate successive positions of the form resulting from 1/35 of a turn rotation.

Thus, the alignment of the slots is carefully controlled and each successive slot hole is found to be in very precise register with its predecessors. It is also apparent that by suitably adjusting the angle of the cam 45, slots may be obtained which are radially disposed or of any desired degree of obliquity.

A punch such as shown in Figure 7 may be employed, in which case the successive slot holes are punched through to the edge of the stock. However, as the stock is under considerable tension, it may tend to stretch unequally when this form of punch is used. In such cases, punches as shown in Figures 3 and 4, in which the punching is located interiorly of the strip, are preferred. Reference character 50 indicates the usual configuration of an armature punching, while 51 shows a form of field punching which will give a preferred pole shape. After the core has been wound, the excess metal, indicated as 52, is removed by grinding or by turning the core down and the slots opened to receive the necessary windings.

While the making of an armature core has been described specifically, the same process would be followed in the fabrication of the field core, except that the intermittent rotations of the form would cover 1/8 of a turn. Similar considerations would apply to fabrications of cores having any number of slot openings.

After the core has been wound on the form with the necessary number of turns, the end of the last turn is secured temporarily to the wound core, the stock is cut, and the core is removed from the form. The core is then placed, slot side inward, in a suitable holding device and portions of the inner and outer circumference are ground down to fit within the channels 27 or 28 as the case may be. When this grinding is completed, the core may be slipped within the channel and the holding device removed. Any tendency of the coil to unwind will be countered by the outer wall of the channel and, as such unwinding would increase the thickness of the ring, this assists in keeping the core in place. Suitable holes may then be drilled for the rivets 29 to complete the assembly of the core and rotor or stator. If punchings such as shown in Figure 7 have been used, the face of the core need only be ground to complete it ready for wiring. If punchings according to Figures 3 and 4 have been used, the face of the core may be turned down to expose the slots, ground and suitably finished.

The windings may now be applied to the armature and the field slots in the usual way and the customary connections made to the commutator. The rotor and stator may then be assembled and adjusted to provide the necessary air gap, the brushes installed and adjusted, and the final electrical connection made.

It will be noted that the rotor is provided with a peripheral overhanging ledge 53 which confines the armature winding and prevents its being displaced by centrifugal force during the operation of the generator. It follows that these windings are secured positively without placing them under great stress and that there is no tendency for them or their commutator leads to be broken or displaced.

This design is particularly adapted to the construction of a flat, thin machine without sacrificing electrical capacity. In addition, a very close adjustment of the air gap and a rotor structure which supports the winding fully and without strain on the winding itself is provided.

This method of constructing cores, while shown in connection with a generator, is adapted to many other forms of electrical machines. The saving in material has already been pointed out. In addition thereto, a core is obtained which may be fabricated in one operation and in which any particular design or location of slots is practicable. Furthermore, the core is "self-tightening" in that its mode of construction tends to prevent any slack or looseness between successive laminations. In larger machines where cores made by prior methods were used, that is, a number of flat plates or laminae were secured together, heavy spiders had to be secured on each side of the core to maintain contact and tightness among the laminated plates. If such plates did loosen, and it was most difficult to prevent their doing so, undesirable noise resulted. Further, when plates of different slot pattern or size were required, a separate die had to be made for each core arrangement and spacing. Under this method, the same dies may be used for any number of spacings, arrangements and sizes, since only the indexing of the form need be changed to obtain such different spacings; and forms of different diameters provided for different sizes. This, in itself, results in a substantial saving.

Some changes may be made in the arrangement, construction and combination of the various parts of my improved construction without departing from the spirit of my invention, and it is my intention to cover by my claims such changes as may be reasonably included within the scope thereof.

I claim:

1. In a generator, a shaft, a rotor secured thereto, a circular channel on said rotor, a ring-shaped core partially disposed in said rotor channel, an overhanging peripheral edge on said rotor, a stator, a circular channel on said stator, a ring-shaped core partially disposed in said stator channel, said cores having radial laminations, slots in said cores, and windings disposed in said slots said edges substantially confining said rotor winding.

2. In a generator, a shaft, a rotor secured thereto, a substantially drum-shaped housing having opposed head walls and an intermediate barrel surrounding said rotor, a stator secured to one head wall of said housing, in juxtaposition to said rotor, said stator head wall of said housing being keyed to the remainder of said housing to permit movement of said head wall axially of said apparatus.

3. In a rotor for electrical apparatus, a shaft, a substantially disc-shaped plate secured thereto, said plate having a circular channel with upstanding walls adjacent the circumference thereof a core in said channel, a winding on said core, and an integral peripheral flange extending from the same side of the plate as said channel on the circumference of said plate to a height substantially conforming to the outer face of said winding in proximity to the outer wall of said channel.

4. In a generator, a shaft, a rotor secured thereto, a circular channel having upstanding walls on said rotor, a ring-shaped core partially disposed in said rotor channel, said ring-shaped core formed of a continuous strip of metal arranged in radial laminations and adapted, on being placed in said channel, to expand radially and to be secured between the walls thereof, slots in said core, windings disposed in said slots, means to prevent centrifugal displacement of said windings, a substantially drum-shaped housing enclosing said rotor and including a bearing for said shaft on one head wall thereof, a circular channel fixed to the inner face of said last-named head wall, an axially slidable connection between the remaining components of said housing and said stator head wall, a circular core received in the channel on said stator head wall, slots in said stator core, and stator windings in said stator slots.

5. In a core mounting for electrical apparatus, a support, a circular channel on the face of said support having upstanding walls, a core comprising a continuous spirally disposed metallic strip forming a ring partially disposed between the walls of said channel and resiliently engaging said walls to secure said core in place, and radially directed securing means transversing said channel walls and said core.

6. A core mounting for an electrical apparatus, comprising, a support, a channel fixed to said support having upstanding walls, said channel being circular in outline, a ring-shaped core comprising spirally wound metal strip disposed in said channel, the radial thickness of said core being slightly less than the radial width of said channel at the placement of said core therein, said core thereafter expanding and resiliently engaging the walls of said channel to secure said core in said channel.

HORACE A. CHUBBUCK.